US012187847B2

United States Patent
Fry et al.

(10) Patent No.: US 12,187,847 B2
(45) Date of Patent: Jan. 7, 2025

(54) POLYKETONE POWDER FOR LASER SINTERING

(71) Applicant: LUMAS Polymers LLC, Chaska, MN (US)

(72) Inventors: Thomas Fry, Victoria, MN (US); John G. Eue, St. Louis Park, MN (US); Steven Kubiak, Edina, MN (US); Zachary Peterson, New Hope, MN (US); Nicholas John Dippel, Burnsville, MN (US); Mathew Artin Torosian, Highlands Ranch, CO (US)

(73) Assignee: LUMAS Polymers LLC, Chaska, MN (US)

( * ) Notice: Subject to any disclaimer, the term of this patent is extended or adjusted under 35 U.S.C. 154(b) by 0 days.

(21) Appl. No.: 18/289,865

(22) PCT Filed: May 16, 2022

(86) PCT No.: PCT/US2022/029424
§ 371 (c)(1),
(2) Date: Nov. 7, 2023

(87) PCT Pub. No.: WO2022/245722
PCT Pub. Date: Nov. 24, 2022

(65) Prior Publication Data
US 2024/0270905 A1    Aug. 15, 2024

Related U.S. Application Data

(60) Provisional application No. 63/217,451, filed on Jul. 1, 2021, provisional application No. 63/189,609, filed on May 17, 2021.

(51) Int. Cl.
| | | |
|---|---|---|
| C08G 67/02 | (2006.01) | |
| B29B 9/02 | (2006.01) | |
| B29B 13/02 | (2006.01) | |
| B29C 64/314 | (2017.01) | |
| B33Y 40/10 | (2020.01) | |
| B33Y 70/00 | (2020.01) | |
| C08J 3/14 | (2006.01) | |
| C08J 9/00 | (2006.01) | |
| C08J 9/36 | (2006.01) | |
| C09D 5/03 | (2006.01) | |
| C09D 173/00 | (2006.01) | |
| B29K 61/00 | (2006.01) | |
| B29K 71/00 | (2006.01) | |

(52) U.S. Cl.
CPC ............. *C08G 67/02* (2013.01); *B29B 9/02* (2013.01); *B29B 13/021* (2013.01); *B29C 64/314* (2017.08); *B33Y 40/10* (2020.01); *B33Y 70/00* (2014.12); *C08J 3/14* (2013.01); *C08J 9/0004* (2013.01); *C08J 9/36* (2013.01); *C09D 5/031* (2013.01); *C09D 173/00* (2013.01); *B29K 2061/00* (2013.01); *B29K 2071/00* (2013.01); *B29K 2995/004* (2013.01); *C08G 2150/20* (2013.01); *C08J 2201/054* (2013.01); *C08J 2361/02* (2013.01); *C08J 2373/00* (2013.01)

(58) Field of Classification Search
USPC ........................................................ 528/493
See application file for complete search history.

(56) References Cited

U.S. PATENT DOCUMENTS

| | | |
|---|---|---|
| 3,065,205 A | 11/1962 | Bonner, Jr. |
| 3,179,631 A | 4/1965 | Endry |
| 3,214,407 A | 10/1965 | Butterworth |
| 3,249,588 A | 5/1966 | Gall |
| 3,441,538 A | 4/1969 | Marks |
| 3,442,857 A | 5/1969 | Thornton |
| 3,516,966 A | 6/1970 | Berr |
| 4,704,448 A | 11/1987 | Brugel |
| 4,755,555 A | 7/1988 | Manwiller et al. |
| 4,816,556 A | 3/1989 | Gay et al. |
| 4,824,720 A | 4/1989 | Malone |
| 4,835,250 A | 5/1989 | Drent |
| 4,853,462 A | 8/1989 | Hostetler et al. |
| 4,894,435 A | 1/1990 | Drent |
| 4,895,689 A | 1/1990 | Gerlowski |
| 4,985,278 A | 1/1991 | George |
| 5,138,032 A | 8/1992 | Mastenbroek et al. |
| 5,391,640 A | 2/1995 | Akkapeddi et al. |

(Continued)

FOREIGN PATENT DOCUMENTS

| | | | | |
|---|---|---|---|---|
| CN | 110655666 A | * | 1/2020 | ............ C08J 3/14 |
| EP | 121965 B1 | | 12/1989 | |

(Continued)

OTHER PUBLICATIONS

CN110655666A Machine Translation (Year: 2020).*

(Continued)

*Primary Examiner* — Terressa Boykin
(74) *Attorney, Agent, or Firm* — Young Basile Hanlon & MacFarlane, P.C.

(57) ABSTRACT

A semicrystalline poly ketone powder useful for additive manufacturing may be made by dissolving a polyketone having differential scanning calorimetry (DSC) monomodal melt peak, at a temperature above 50° C. to below the melt temperature of the polyketone, precipitating the dissolved polyketone by cooling, addition of a nonsolvent or combination thereof. The method may be used to form polyketones having a DSC melt peak with an enthalpy greater than the starting polyketone.

20 Claims, 5 Drawing Sheets

(56) References Cited

U.S. PATENT DOCUMENTS

| | | |
|---|---|---|
| 5,395,055 A | 3/1995 | Shutov et al. |
| 5,527,877 A | 6/1996 | Dickens, Jr. et al. |
| 5,597,589 A | 1/1997 | Deckard |
| 5,670,102 A | 9/1997 | Perman et al. |
| 5,952,066 A | 9/1999 | Schmidt et al. |
| 5,977,231 A | 11/1999 | Ash |
| 6,136,948 A | 10/2000 | Dickens, Jr. et al. |
| 6,177,518 B1 | 1/2001 | Lahijani |
| 6,213,540 B1 | 4/2001 | Tusim et al. |
| 6,284,810 B1 | 9/2001 | Burnham et al. |
| 7,267,534 B2 | 9/2007 | Xu |
| 10,364,349 B1 | 7/2019 | Bertelo et al. |
| 10,479,733 B2 | 11/2019 | Diekmann et al. |
| 11,851,526 B2 | 12/2023 | Louis et al. |
| 2003/0181538 A1 | 9/2003 | Martel et al. |
| 2005/0276967 A1 | 12/2005 | Prasad |
| 2008/0058494 A1 | 3/2008 | Shim et al. |
| 2012/0077010 A1 | 3/2012 | Manesis et al. |
| 2012/0114848 A1 | 5/2012 | M Iler et al. |
| 2013/0323416 A1 | 12/2013 | Bertelo et al. |
| 2015/0011815 A1 | 1/2015 | Ma et al. |
| 2017/0282430 A1 | 10/2017 | Baldwin et al. |
| 2017/0326790 A1 | 11/2017 | Lee et al. |
| 2018/0200922 A1 | 7/2018 | DeFelice et al. |
| 2020/0247012 A1 | 8/2020 | DeFelice et al. |
| 2021/0277180 A1 | 9/2021 | Gardner et al. |
| 2021/0277192 A1 | 9/2021 | Gardner et al. |
| 2022/0363825 A1 | 11/2022 | Kubiak et al. |
| 2022/0363826 A1 | 11/2022 | Fry et al. |

FOREIGN PATENT DOCUMENTS

| | | |
|---|---|---|
| EP | 0431924 A2 | 6/1991 |
| KR | 10-2016-0108820 A | 9/2016 |
| NL | 8801276 A | 12/1989 |
| WO | 9606881 A2 | 3/1996 |
| WO | 0138061 A1 | 5/2001 |
| WO | 2017033146 A1 | 3/2017 |
| WO | 2021137086 A1 | 7/2021 |

OTHER PUBLICATIONS

"Hydrocerol and Colormatrix Excelite Chemical Foaming Additives." Product Selection Guide, Avient (6 pages).

Altan, M., "Thermoplastic Foams: Processing, Manufacturing, and Characterization." DOI: 10.5772/intechopen.71083. (23 pages).

Bhamidipati, M., MS et al., "The Future of Carbon Dioxide for Polymer Processing in Tissue Engineering." Tissue Engineering: Part B, vol. 19, No. 3, 2013. DOI: 10.1089/ten.teb.2012.0361. (12 pages).

Chen, Youming et al., "Effects of Cell Size and Cell Wall Thickness Variations on the Strength of Closed-Cell Foams Using Laguerre Tessellation." 21st International Conference on Composite Materials, Aug. 2017 (15 pages).

Database WPI Week 202001, Thomson Scientific, Long, GB; AN 2020-05446X.

Gendron, R. et al., "Supercritical Fluids in Thermoplastics Foaming: Facts or Fallacies?" Rapra Technology, 2006, Cellular Polymers. vol. 25, No. 4, 2006 (24 pages).

Groenewoud, Wim et al., "Characterization of Polyketone Copolymer by High Speed DSC." Application Note; PerkinElmer product information (6 pages).

International Search Report and Written Opinion in co-pending application PCT/US2022/029424 mailed Sep. 1, 2022 (14 pages).

Jimenez, J. et al., "Foaming of PLA Composites by Supercritical Fluid-Assisted Processes: A Review." Molecules 2020, 25, 3408; doi: 10.3390/molecule25153408 (39 pages).

Jin, Fan-Long et al., "Recent Trends of Foaming in Polymer Processing: A Review." Polymers 2019, 11, 953; DOI: 10.3390/polym11060953 (23 pages).

Klop, E.A., et al., "Polymorphism in alternative polyketones studied by x-ray diffraction and calorimetry." Jouronal of Polymer Science Part B: Polymer Physics / vol. 33, Issue 2. (2 pages).

Maloo et al.,"A Sneak Peek Toward Polyaryletherketone (PAEK) Polymer: A review", Cureus, vol. 14, No. 11, Nov. 3, 2022. (9 pages).

Migliore, Nicola et al., "Effect of the Polyketone Aromatic Pendent Groups on the Electrical Conductivity of the Derived MWCNTs-Based Nanocomposites . . . " Polymers 2018, 10, 618; doi: 10.3390/polym10060618 (16 pages).

Naitove, Matthew, "A Rare 'Resurrection' in Engineering Plastics." Plastics Technology, Published Oct. 27, 2014.

Nalawade, S. et al., "Supercritical carbon dioxide as a green solvent for processing polymer melts: Processing aspects and applications." Prog. Polym. Sci. 31 (2006) 19-43 (25 pages).

Olson, Eric, "Particle Shape Factors and Their Use in Image Analysis Part II: Practical Applications." Journal of GXP Compliance, Autumn 2011 vol. 15 No. 4 (13 pages).

Sauceau, M. et al., "New challenges in polymer foaming: A review of extrusion processes assisted by supercritical carbon dioxide." Progress in Polymer Science, (2011) 36: 749-766 (30 pages).

Schmid et al.,"Materials perspective of polymers for additive manufacturing with selective laser sintering", Journal of Materials Research, vol. 29, No. 17, Sep. 14, 2014. (1824-1832 pages).

Sichina, W.J., "Measurement of Tg by DSC." Perkin Elmer™ instruments. 2000 PerkinElmer, Inc., PETech-09 Thermal Analysis (5 pages).

Toncelli, Claudio, "Functional Polymers from Alternating Aliphatic Polyketones: Synthesis and Applications." Publication date 2013, University of Groningen (136 pages).

Wikipedia: Polyketone definition (4 pages).

International Preliminary Report on Patentability issued in co-pending Application No. PCT/US2022/029422 mailed Dec. 5, 2022 (18 pages).

Industrial Specialties Mfg. & IS Med Specialties; Mesh and Micron Sizes, Mar. 11, 2020, pp. 1-7.

\* cited by examiner

POLYKETONE POWDER FOR LASER SINTERING

CROSS-REFERENCE TO RELATED APPLICATIONS

This application is a National Stage 371 entry of PCT/US2022/029424 filed on May 16, 2022, published as WO2022/245722, which claims priority to U.S. Provisional Patent Application Nos. 63/189,609 filed on May 17, 2021, and 63/217,451 filed on Jul. 1, 2021, all of which are incorporated herein by reference in their entirety for all purposes.

FIELD

The present invention relates to powders useful for making additive manufactured articles. In particular, the invention relates to aliphatic semicrystalline polyketone powders.

SUMMARY

Powder-based methods of additive manufacturing include the following: Selective laser sintering (SLS) is a 3D-printing technique that uses a laser to fuse powder material in successive layers (see, for example, U.S. Pat. No. 5,597,589). High-speed sintering (HSS) and multi-jet fusion (MJF) 3D-printing employ multiple jets that similarly deposit successive layers of infrared-absorbing (IR-absorbing) ink onto powder material, followed by exposure to IR energy for selective melting of the powder layer. Electrophotographic 3D-printing employs a rotating photoconductor that builds the object layer-by-layer from the base.

Selective laser sintering (SLS), multi-jet fusion (MJF), and high-speed sintering (HSS) 3D-printing methods use the same type of free-floating, non-fixed powder bed. They generally have the same material requirements for compatibility with the printing process since the additively built object will experience similar stresses, only with different heating mechanisms to obtain the melt phase. Typically, a free-body diagram of a 3D printed object can be used to determine the residual stresses expected in the printed object. This is necessary for successfully building the object. If the residual stress is too high, the object will deform or be deformed beyond acceptable tolerances.

The residual stresses have typically been minimized for these powder bed-based 3D printers by using crystalline or semicrystalline thermoplastic polymers having sufficiently large window between its melting temperature and its recrystallization temperature. Unfortunately, this has limited the polymers that have successfully used to print large or complex parts using SLS and MJF methods (e.g., polyamides), thus limiting the use of these additive manufacturing methods.

Aliphatic polyketones are promising polymers, in part due to their physical properties and chemical resistance as a low cost engineering plastic. Polyketones are typically copolymers of ethylene (and/or other olefins or alkenes) and carbon monoxide produced by copolymerization in the presence of a palladium (or other) catalyst such as described in U.S. Pat. No. 4,835,250 and US20080058494. The aliphatic polyketone is then typically separated from the other components that are present in a polymerization reactor. These other components may include unreacted alkene, unreacted carbon monoxide, methanol (or other) reaction medium, and catalyst. The polyketone product that is separated from the other components (by separation and drying, for example) is referred to as "reactor flake". The reactor flake due to its fine particle size causing difficulty in handling and shipping is typically heated and extruded to form pellets for commercial sale resulting in undesirable characteristics such as low melt peak enthalpy and possible cross-linking of the polyketone due exposure above the melt temperature when forming the pellets.

Accordingly, it would be desirable to provide a thermoplastic polymer that avoids one or more problems to produce additive manufactured articles by methods such as SLS, HSS, MJF and the like such as those described above. In particular, it would be desirable to provide a thermoplastic polymer that may provide a high strength, tough, high temperature resistant, flame retardant and in some cases optically transparent article.

SUMMARY

Applicants have discovered a method of treating an aliphatic polyketone to realize certain powder morphology and thermal characteristics allowing for improved additive manufacturing of these materials by floating powder bed methods. Surprisingly, in one example, the polyketone powder displays a DSC melt peak displaying a high enthalpy peak (at least 75 J/g). The enthalpy of the melt peak may be increased substantially, which may be useful when 3D printing (e.g., enthalpy may be greater than 30, 40, 50, 60, 75, 100, 125, 150 or even 175 joules/gram of polyketone), while avoiding cross-linking of the polyketone.

A first aspect of the invention is a composition comprising a semicrystalline polyketone powder comprised of a semicrystalline polyketone powder having a melt peak that has a melt enthalpy of at least about 50 joules/gram.

A third aspect is a method to form an improved semicrystalline polyketone comprising;
(i) dissolving an initial polyketone in a solvent above 50° C. to below the onset melt temperature of the polyketone to form a solution comprised of a dissolved polyketone,
(ii) precipitating the dissolved polyketone by cooling the solution, addition of a non-solvent to the solution or combination thereof to form the improved semicrystalline polyketone, and
(iii) separating the improved polyketone semicrystalline polyketone from the solvent.

The improved polyketone powder may be further treated by milling to realize the desired particles size and subject to further treatments to change the crystallinity and change the DSC melt characteristics desirable for additive manufacturing (e.g., realize the first aspect of the invention). The separated polyketone may be subject to further treatments to remove undesired solvent such as by further washing in a non-solvent.

The polyketone formed by the method such as those in aspects 1 and 2 are particularly useful for forming an article by additive manufacturing methods such as floating powder bed methods (e.g., SLS, HHS and MJF methods). Such polyketone powders desirably have a D90 particle size of at most 300 micrometers and average particle size of 1 micrometer to 150 micrometers equivalent spherical diameter. These polyketones may be printed by floating powder bed additive manufacturing techniques such as SLS, HSS and MJF. The compositions may be made into additive manufactured articles taking advantage of the properties of this engineering plastic (e.g., heat resistance and chemical resistance and low coefficient of friction with many other materials). Examples of such application include biocompatible (medical), electrical, transportation (e.g., automotive, rail, trucking), plumbing, aerospace, food contact, industrial (e.g., machinery) and consumer (e.g., appliances) applications.

DETAILED DESCRIPTION

The explanations and illustrations presented herein are intended to acquaint others skilled in the art with the invention, its principles, and its practical application. The specific embodiments of the present disclosure as set forth are not intended to be exhaustive or limit the scope of the disclosure.

One or more as used herein means that at least one, or more than one, of the recited components may be used as disclosed. It is understood that the functionality of any ingredient or component may be an average functionality due to imperfections in raw materials, incomplete conversion of the reactants and formation of by-products.

The method comprises dissolving an initial polyketone in a solvent above 50° C. to below the onset melt temperature of the polyketone to form a solution comprised of a dissolved polyketone. Typically, the solvent is heated to a temperature above 100° C. to a temperature below the onset melt temperature of the particular polyketone, which is determined by differential scanning calorimetry (DSC) as described herein. Illustratively, the solvent is heated above, 75° C., or 100° C. to 5%, 10% or 20% below the onset melt temperature of the polyketone with examples being at most about 200° C., 180° C., 170° C. or 160° C.

The initial polyketone may be any that is formed comprised of repeating units represented by where A is the residue of an alkene monomer converted to a saturated hydrocarbon group, m is from about 1 to 6 and n is at least about 2 to any practicable amount to realize the desired number average molecular weight useful in the invention. Exemplary useful number average molecular weights may be those that provide melting temperatures from about 175° C. or 210° C. to about 270° C. or 300° C. and may be from about 1000 to 250,000 or about 10,000 to 200,000.

The initial polyketone of the composition desirably is one that is a terpolymer of carbon monoxide, ethylene and another alkene monomer (e.g., olefin of 3 to 12, 8 or 6 carbons and in particular propylene). Such polyketone may be represented by random repeating units:

where G is the saturated residue of an olefin of 3 to 12, 8 or 6 carbons polymerized through the double bond and x/y is at least 2 to 100 or 50 or 20. Desirably, G is propylene. The polyketone may be terminated by any useful group such as alkyl group, hydroxyl, ester, carboxylic acid, ether or combination thereof. The particular terminating group may arise from using a solvent such as a low molecular alcohol such as methanol or water or combination thereof.

The initial polyketone typically display a monomodal melt peak that is separated from the crystallization peak, which may be due to the melt extruding of the polyketone to form the polyketone into pellets. Commercially available polyketones may be useful as the initial polyketone such as those known in the art (e.g., those available under the tradename POKETON, Hyosung, KR).

The time at the maximum heating temperature (dissolution temperature) is any that realizes the desired dissolution of the polyketone (typical is from 3 or 4 minutes to 3 or 4 hours). More than one elevated temperature may be used (held) during the process. For example, a higher temperature may be used to dissolve the polyketone (dissolution temperature) and a lower temperature when precipitating the polyketone (precipitation temperature). The precipitation temperature is the temperature where the polyketone begins to precipitate upon cooling or the temperature where precipitation is induced by addition of a non-solvent. The precipitation temperature may be any that is useful from and above ambient ~20° C. to the dissolution temperature (when precipitating by addition of a non-solvent), to a temperature below the dissolution temperature (e.g., to 130° C., 125° C., 100° C., 75° C., or 50° C.). The precipitation temperature desirably is below the temperature where the nonsolvent begins to boil (onset boiling temperature as determined by DSC in like manner as the melt peak is determined herein). Agitation may be used during any portion or the entire process.

Agitation is as commonly understood in which stirring the components in a liquid or slurried mixture under conditions in which shear forces are generated, creating patterns of flow and turbulence, generally using an impellor that rotates inside a stator. The stirring may be any useful to realize a shear rate that results in the desired particle size and shape. Once the impellor has drawn mixture in, it subjects the mixture to sudden changes of direction and acceleration such that the mixture contacts the wall of the stator with centrifugal force, or is forced through the holes in the stator under pressure and speed, in a final disintegrating change of direction and acceleration. In exemplary embodiments of high shear mixing conditions, mixing comprises operating at speeds of 50 rotations per minute (rpm) to 500 rpm.

Desirably, the atmosphere is any, where the solvent and other chemicals do not deleteriously react with the atmosphere. Typically, the dissolution is carried out at applied pressures at or near ambient pressures (e.g, ±10%, ±1% or ±0.1% of atmospheric pressure) in a closed vessel to minimize volatilization losses. The use of elevated pressures may be used but is not necessary. Exemplary atmospheres, depending on the solvent may include nitrogen or noble gases (e.g., argon) or combination thereof or air (e.g., dry air).

The amount of polyketone dissolved in the solvent may be any useful amount that may then be precipitated from the solution upon cooling, introducing a nonsolvent or combination thereof. Illustratively, the amount of polyketone that is dissolved may be from 1%, 5%, 10% to any practical amount (not gelled), 50%, 40%, 30% or 25% by weight.

The polyketone herein encompasses polymers made by polymerizing carbon monoxide and an alkene monomer in the presence of a group 8 to 10 transition metal catalyst. In particular, the polyketone may be any made by a method such as any one of those described in U.S. Pat. Nos. 4,835,250; 4,894,435 and 5,138,032 and US Pat. Publ. No. 2008/0058494 each incorporated by reference in its entirety. In particular, the method, reaction conditions and monomers are those described in U.S. Pat. No. 5,138,032 from col. 2 line 52 to col. 5, line 17 specifically incorporated herein by reference.

Desirably, the alkene monomer is comprised of an olefin having from 2 to 12, 8 or 6 carbons. Illustratively, the alkene monomer is ethylene or the alkene monomer comprises ethylene and at least one other olefin monomer such as propylene. When the polyketone is a copolymer of ethylene and another olefin monomer (e.g., propylene), the amount of ethylene and other olefin is as described in U.S. Pat. No. 5,138,032 from col. 2, line 17 to col. 3, line 14.

The solvent may be any useful solvent for dissolving the polyketone such as polar aprotic solvents. Typically, the solvent has a volatility or low viscosity that allows for the ease of removal in subsequent processing steps such as separating the precipitated polyketone from the solvent. Typically, the solvent has a viscosity within an order of magnitude of the viscosity of water at ambient conditions (e.g., ~ 1 centipoise @ about 20° C. to 25° C. and 1 atmosphere of pressure). That is the viscosity is typically less than 10 centipoise to 0.1 centipoise (cp). The volatility likewise as measured by the boiling point (or range) at 1 atmosphere of pressure is typically from about 30° C., 50° C. or 75° C. to 150° C., 200° C. or 250° C. The solvent typically has a molecular weight (weight average Mw) of Mw of at most about 500 g/moles, 200 g/moles, or even 150 g/moles to at least about 30 g/moles. It is understood, that in some instances, the solvent may be a solid at ambient conditions, but has the aforementioned boiling temperature and useful viscosity at an elevated temperature (e.g., less than about 100 cp or 10 cp), where the dissolution is carried out.

The solvent may be a mixture of solvents. As an illustration the solvent may be mixture of a liquid solvent at room temperature and another solvent that is a solid at room temperature that dissolves in the liquid solvent, where the dissolved solvent imparts one or more desirable characteristic (e.g., improved solubility of the polyketone or particle formation when using a non-solvent to precipitate the polyketone from solution).

The solvent may contain some water and still be useful in carrying out the dissolution and precipitation. Generally, the amount of water in the solvent is at most about 1%, 0.5%, 0.2%, 0.1%, 0.05%, 0.01% or 10 parts per million (ppm) by weight. The water concentration may be determined by any suitable method such as Karl Fischer titration. To realize the desired water concentration any suitable method for drying solvents may be employed such as those known in the art. For example, the solvents may be dried by distillation or contacted with molecular sieves to remove water. Dried solvents may be further denatured as described and specified by U.S. Title 27 of the Code of Federal Regulations Section 21.151. The desired water concentration may be realized by a known method (e.g., distillation and adsorption).

The solvent has one or more groups creating a sufficient dipole to realize a dielectric constant of at least 10 and typically less than about 100. Examples of such groups include an, ether, carbonyl, ester, alcohol, amine, amide, imide, halogen or any combination thereof. Desirably, the dielectric constant of the solvents is at least about 15 to about 90, 80 or 50, 40, or 30. The dielectric constant may be calculated from the dipoles present in the solvent molecule or determined experimentally such as described in J. Phys. Chem. (2017), 121, 2, 1025-1031.

The solvent may be linear, branched, aromatic or cyclic having the aforementioned Mw with one or more heteroatoms (e.g., O, N, S, Si or halogen) to about 10, 8, 6, 4 or 3 heteroatoms so long as the solvent has a dielectric constant of at least about 10. Typically, the amount of carbons is from 1 to 24, 18, 16, 12 or 6. Examples, of polar aprotic solvents that may be useful include, ketone (e.g., acetone, di-isopropyl ketone and methyl butyl ketone), aliphatic or aromatic halogenated hydrocarbon solvent (e.g., chloromethane, dichloromethane, trichloromethane, 1,2-dichloroethane, or 1,1,1-trichloroethane, chlorobenzene, 1,2-dichlorobenzene, 1,3-dichlorobenzene, and 1,2,3-trichlorobenzene), carbonate (e.g., propylene carbonate (PC), ethylene carbonate (EC), butylene carbonate (BC), chloroethylene carbonate, fluorocarbonate solvents (e.g., fluoroethylene carbonate and trifluoromethyl propylene carbonate), as well as the dialkyl-carbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC).

Some examples of sulfone solvents include methyl sulfone, ethyl methyl sulfone, methyl phenyl sulfone, methyl isopropyl sulfone (MIPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl) sulfone).

The polar aprotic solvent may also be silicon-containing, e.g., a siloxane or silane. Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane.

Other examples of polar aprotic solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, and the fluorinated ethers (e.g., mono-, di-, tri-, tetra-, penta-, hexa- and perfluoro derivatives of any of the foregoing ethers and 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, benzonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone.

The polar aprotic solvent may also be diethyl ether, tetrahydrofuran, and dioxane), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA).

The non-solvent used to induce the precipitation at the precipitation temperature may be any suitable. Illustratively, the solvent may be NMP, DMPU, PGMEA or HMPA and the non-solvent may be a protic solvent such as water, a low molecular weight alcohol (e.g., C1 to C4 alcohol) or mixtures thereof. The amount of non-solvent may be any necessary to cause the precipitation at a given precipitation temperature with that amount being any useful for realizing a desired precipitated polyketone particle size, size distribution and morphology. Typically concentrations of the non-solvent added may be 0.1%, 1%, 5% or 10% to typically 75%, 50% or 25% by volume of the solvent and non-solvent.

Typically a mixture (slurry) of an initial polyketone powder and solvent are prepared at ambient conditions while agitating the slurry. Typically, the temperature is raised to facilitate the dissolution temperature to dissolve the polyketone. Desirably, the dissolution temperature is below the boiling point of the solvent by at least 10° C. To facilitate the precipitation and formation of desired particles, the solution is cooled to cause the precipitation temperature to precipitate, the polyketone preferably in powder form from the solution. The polyketone powder may then be separated by any suitable method such as filtration, centrifugation, flotation or other known method or combination thereof. The separation may be facilitated by one or more additives such as solvents of lower molecular weight, surface active agents, flotation enhancers and the like. The separation may be performed by filtration (e.g., vacuum filtration).

Additives may be added during the method to impart one or more desired characteristics in the polyketone powder useful for floating bed additive manufacturing techniques. For example, one or more of a UV stabilizer, filler, lubricant, plasticizer, pigment, flow aid, or flame retardant may be added. The additive if remaining as a solid in the solvent when performing the method may act as a nucleating agent and become encompassed by the precipitating polyketone. The amount of any particular additive may be any useful amount to realize a particular property for printing or characteristic of the article formed therefrom. Generally, the amount of the additive or additives, when present, is at most about 50%, 25%, 10% or 5% by volume of the composition. The flow aid may be any known compound for improving the flowability of powders with fumed silica being an example (e.g., Aerosil 200).

The filler may be any useful filler such as those known in the art. Examples of the filler ceramics, metals, carbon (e.g., graphite, carbon black, graphene), polymeric particulates that do not melt or decompose at the printing temperatures (e.g., cross-linked polymeric particulates, vulcanized rubber particulates and the like), plant based fillers (e.g., wood, nutshell, grain and rice hull flours or particles). Exemplary fillers include calcium carbonate, talc, silica, wollastonite, clay, calcium sulfate, mica, inorganic glass (e.g., silica, alumino-silicate, borosilicate, alkali alumino silicate and the like), oxides (e.g., alumina, zirconia, magnesia, silica "quartz", and calcia), carbides (e.g., boron carbide and silicon carbide), nitrides (e.g., silicon nitride, aluminum nitride), combinations of oxynitride, oxycarbides, or combination thereof.

The method has surprisingly been found to be able to make the aliphatic polyketone with a DSC melt peak having a greater enthalpy that may also have a bi-modal shaped peak (bimodal peak). The enthalpy of the melt peak may be 10%, 20% or 30% or more than the starting melt peak enthalpy of the starting polyketone. Typically, after performing the method, the melt peak onset temperature fails to overlap with the onset of the crystallization temperature. It has also been discovered that if the polyketone having the high melt enthalpy is heated to within 5%, 10% or 20% of the onset melting temperature of this polyketone, a polyketone still having a melt peak may be formed that does not overlap with the crystallization peak and may have a reduced enthalpy, but the process may allow for the tunability of the separation of the melt peak onset temperature and the crystallization onset temperature.

Illustratively, the polyketone after precipitating in the method of the invention may be heated in any suitable atmosphere such as air, inert atmosphere or nitrogen. The heating rate may be any useful and may be dependent on the peak temperature (annealing temperature) that is used. For example, the heating rate may be desirably faster when the annealing temperature is higher such as above the onset melt temperature of the polyketone (e.g., greater than or equal to 1° C., 5° C., 10° C., 20° C.). Likewise, the annealing temperature may be held for any useful time and may depend on the annealing temperature used in the same manner as the heating rate. Illustratively, if the annealing temperature is equal to or greater than the onset melt temperature, typically the annealing time is less than 2 hours, 1, or 0.5 hours.

The method has also been discovered to avoid the problem of the polyketone from cross-linking, which may render it unable to be additive manufactured or if partially cross-linked impeding, for example, the fusion and adherence within and between layers. The degree of cross-linking may be shown by Dynamic Mechanical Analysis, where increasing cross-linking is shown by an increasing temperature where the storage modulus decreases until there is no melt behavior (the storage modulus does not exhibit a decrease). Typical heating rates such as 3 C/min and Frequency 1 Hz may be used such as described in ASTM D4065. That is, the method may be used to prepare polyketone powders free from any cross-linking or an amount of cross-linking no greater than the as formed polyketone has. Methods, to heat and anneal that minimizes the problem of heating and cooling large masses, may be preferably employed such as those known in the art including, for example, a fluid bed, rotary kiln or vertical tube furnace.

Depending on the agitation and particular method used to precipitate, the polyketone that is formed may be further classified, comminuted or the like by any suitable method such as those known in the art. Exemplary classification methods may include centrifugation, sedimentation and air cyclones. The size reduction (comminution) may be carried out by any suitable method such as those known in the art. Illustratively, milling at a temperature where the semicrystalline polyketone becomes embrittled may be used and is commonly referred to as cryomilling. Generally, the temperature for cryomilling may be any temperature below about 0° C., −25° C., −50° C. to about −75° C., −100° C., −150° C., or −190° C. In an embodiment, the cooling is provided by using dry ice or liquid nitrogen. After cryomilling, the milled polyketone powder may be further classified with any particles that are larger than desired separated and subject to further milling and particles that are undersized may be fused in any suitable manner classified or milled to realize the desired size.

The crystallization or recrystallization peak (used herein interchangeably) may overlap with the melt peak in the initial DSC scan of the polyketone powder and still yield a powder that can be additive manufactured with good properties and without warping or distortion. But typically, the melt and crystallization onset temperatures do not overlap.

The polyketone powder's crystallizaton temperature (Tc) is below the melt temperature (Tm) of the semi-crystalline polymer as determined by the peak of the melt and crystallization peak and in the case of a bimodal peak by the lower temperature peak. Generally, the Tc of the polyketone is about 5° C. to 40 or 50° C. below Tm. The Tm and Tc is determined from the melt peak of the DSC by as described by ASTM D3418 using the midpoint of the melt peak. The onset of the Tm and Tc peaks likewise are determined as per ASTM D3418 (i.e., deviation of the scan from linear).

The polyketone powder derived directly may have a morphology allowing for it to be additive manufactured in the absence of a flow aid. Desirably, the polyketone having such desirable flow characteristics have a sphericity In terms of particle shape, and in particular particle roundness, which aids in flowability, and as derived from micrograph images of individual particles, may be expressed in terms of circular character, or circularity, where individual particle circularity is defined as the 4 $\pi A/P^2$, where A is the area of the particle and P is the perimeter length of the particle, both as viewed from a random perspective. Sphericity, a related parameter, is derived as the square root of circularity. Circularity is a numerical value greater than zero and less than or equal to one. A perfectly circular particle is referred to as having a circularity of 1.00. Tables of population circularity data are represented in such a way that various levels of circularity (e.g., 0.65, 0.75, 0.85, 0.90, and 0.95) are accompanied by percentages of the particle sample population with a circularity greater than the tabulated value. The circularity is determined at a solidity filter level of 0.9 or 0.95. Solidity filter is a filter used to remove overlapping particles in a 2-dimensional micrograph available in commercial image analysis software. Solidity in essence is the area of a particle over the area (particle area) of an area defined by the major and minor axis of the particle area in a 2-dimensional micrograph. Particle size and shape can be measured by any suitable methods known in the art to measure particle size by diameter. In some embodiments, the particle size and shape are determined by laser diffraction as is known in the art. For example, particle size can be determined using a laser diffractometer such as the Microtrac S3500 with static image analysis accessory using PartAnSI software to analyze the captured images of the particles. Desirably, at least about 65%, 70%, 80%, 95% or 99% of the particles (by number) have a circularity is at least about 0.8, 0.85, 0.9 or 0.95 for the powders separated and classified from the reactor without further treatment other than purification.

Likewise the polyketone powders without the addition of any flow aid generally have a flowability of at least about 0.5 g/s, 1 g/s or 2 g/s to any practically achievable rate (e.g., 50 g/s) using a 15-mm nozzle as determined by Method A of ASTM D 1895.

The aforementioned semicrystalline polyketones of the invention have a crystallinity of at least about 15% by weight to essentially crystalline, with higher degrees of crystallinity being desirable. Desirably, the crystallinity is anywhere from 20%, 25% or 30% to essentially crystalline, 90%, 80%, 75%, 60% or 55%. The crystallinity may be determined by any suitable methods such as those known in the art. Illustratively, the percent crystallinity may be determined by x-ray diffraction including, for example, wide angle x-ray diffraction (WAXD), such as by using a Rigaku SmartLab x-ray diffractometer, or by differential scanning calorimetry (DSC), such as by using a TA Instruments DSC250 differential scanning calorimeter ASTM D3418-15.

The polyketone of the composition may have any DSC melt peak enthalpy useful for making a powder useful in additive manufacturing such as SLS. Typically, the enthalpy is at least 3 joules/gram, but desirably is at least 5, 10, 20, 30, 40, 50, 60, 70 or 75 joules/gram or more to any practical amount such as 200 joules/gram. The enthalpy of the DSC melt peak may be determined according to the manner described by ASTM D3418.

The semicrystalline polyketone of the aforementioned particles generally have a particle size and size distribution that is useful for making additive manufactured articles and typically have, and an average or median particle size ($D_{50}$), by volume, from about 1 micrometer (μm), 10 μm, 20 μm, 30 μm or 40 μm to 150 μm, 125 μm, 110 μm or 100 μm. Likewise, to enable consistent heating and fusion of the powder, it desirably has a $D_{90}$ of at most 300 μm, 200 μm or 150 μm. To aid in flowability the polyketone desirably has a $D_{10}$ of at least 0.1 μm, 0.5 μm or 1 μm by volume. $D_{90}$ means the particle size (equivalent spherical diameter) in the particle size distribution, where 90% by volume of the particles are less than or equal to that size; similarly, $D_{50}$ means the particle size (equivalent spherical diameter) in the particle size distribution, where at least 50% by volume of the particles are less than that size, and $D_{10}$ means the particle size (equivalent spherical diameter) in the particle size distribution, where at least 10% by volume of the particles are less than that size. The particle size may be determined by any suitable method such as those known in the art including, for example, laser diffraction or image analysis of micrographs of a sufficient number of particles (~100 to ~200 particles). A representative laser diffractometer is one produced by Microtrac such as the Microtrac S3500.

The compositions of this invention may further comprise useful additives such as those known in the art for making articles such as additive manufactured articles. For example, the composition may have one or more of a UV stabilizer, filler, lubricant, plasticizer, pigment, flow aid, flame retardant, or solvent. Desirably, the composition is essentially free of solvent (i.e., at most a trace amount, which may be at most 10 parts per million (ppm) by weight of the composition, 1 ppm). The amount of any particular additive may be any useful amount to realize a particular property for printing or characteristic of the article formed therefrom. Generally, the amount of the additive or additives, when present, is at most about 50%, 25%, 10% or 5% by volume of the composition. The flow aid may be any known compound for improving the flowability of powders with fumed silica being an example (e.g., Aerosil 200).

It has been discovered that the polyketone of the compositions of this invention allow for the formation of shaped articles that do not deform or possess undesirable amounts of residual stress. For example, but not limited to, the compositions of this invention may be made into a body by an additive manufacturing method such as SLS, MJF, HSS or electrophotography. Illustratively, in SLS, a layer of the composition of this invention may be deposited on a bed at a fixed temperature below the melting temperature of the polyketone powder and a predetermined (selected) area of the bed is sintered (fused) together using a heating source such as a laser controlled and directed as described above. Layers are then in succession deposited and sintered to the preceding layer and within the layer to build up an additive manufactured part.

Typically, the "operating window" for additive manufacturing semicrystalline thermoplastic polymers is the temperature difference between the onset temperature at which the material melts to the onset temperature at which it recrystallizes ("Tc"), which generally is as large as possible. As described above, the polyketone may be tuned by heating quickly and held for a short time at the temperature (annealing temperature) to tune the melt peak shape and onset temperature. For example, the polyketone may be further optimized wherein the operating window may be anywhere from 5° C., 10° C., or 20° C. to any realized temperature differences such as 60° C., 50° C., 30° C., or 25° C.

Because the polyketone powders of the compositions of this invention display good 3d printability, they may be recycled and reused without further treatments after being printed by powder additive manufacturing methods that involve heating and maintaining the bed of powder just below the onset melt temperature of the polyketone. If desired the recycled powder may be mixed with any of the polyketone powders described herein that have not yet been additive manufactured to realize desired printability characteristics or part properties. The proportion of recycled polyketone making up the compositions of this invention may be any amount from essentially all of the composition, 90%, 75%, 50%, 40% or 30% to about 1, 5% or 10% being recycled by weight of the polyketone powder of the composition. The thermal characteristics of the recycled powders generally are as described above for the polyketone that has been pelletized reduced in size to for the polyketone powder of this invention. The morphology and size distribution likewise are as described herein with the morphology being most akin to the morphology of the particular initial polyketone powder used to form the additive manufactured article.

The compositions of this invention may be used to make an additive manufactured article comprised of a plurality of fused polyketones of this invention. In particular, the compositions may be used to make additive manufactured articles made by the sequential selective heating of powder layers that fuse the particles within and between the layers such as in SLS, HSS and MJF.

EXAMPLES

Example 1

Figure 1:
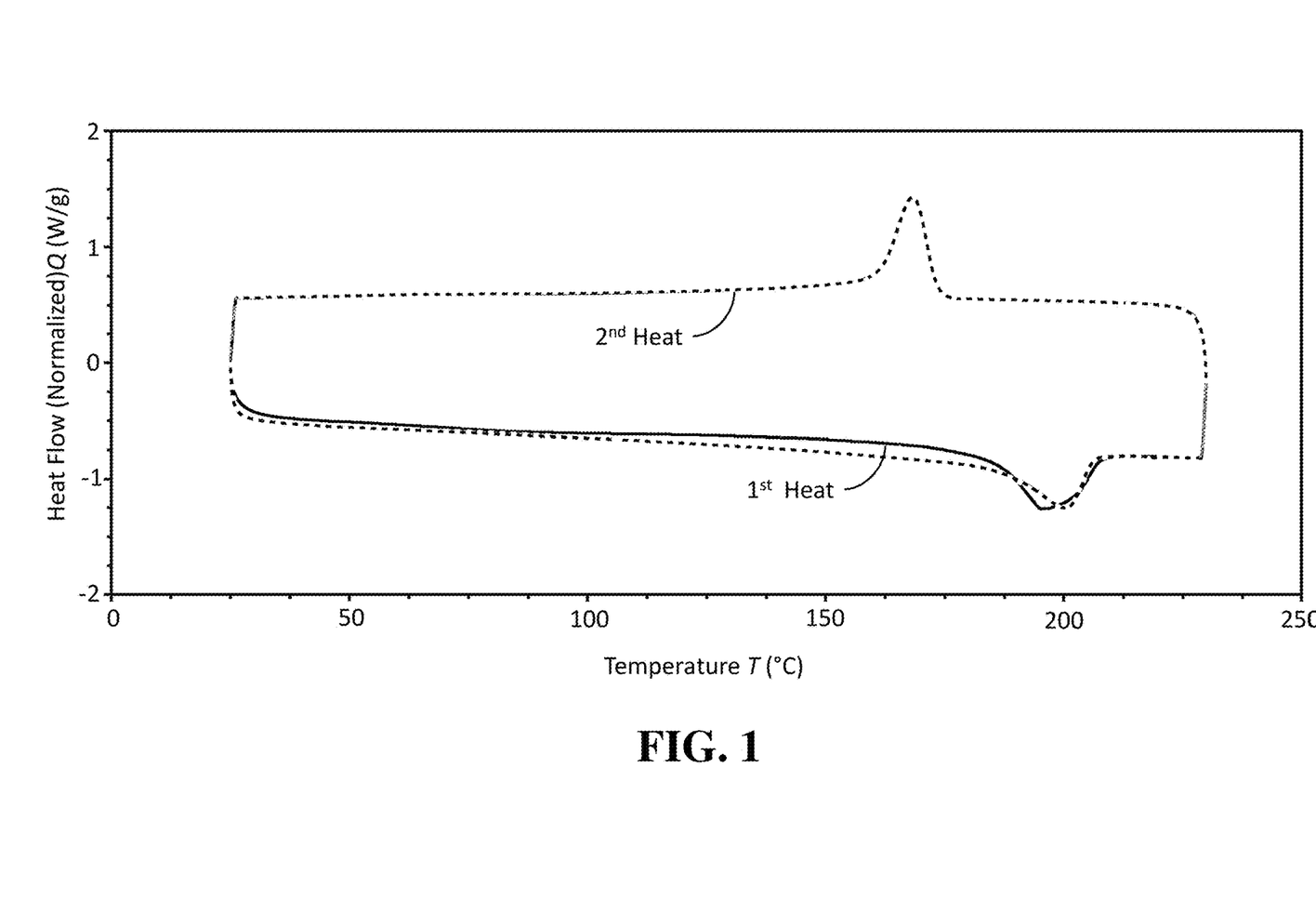
FIG. 1 is a plot of a differential scanning calorimetry (DSC) plot of a polyketone not of this invention.

Polyketone powder is made by a process in the manner described in U.S. Pat. No. 5,138,032 from col. 2 line 52 to col. 5, line 17 and melt extruded (~240° C.) to form pellets of polyketone (pelletized polyketone). The pelletized polyketone's thermal behavior is shown in the DSC curve or FIG. 1. The melt peak enthalpy is 40 J/g, the onset melt peak temperature is 180° C., and the onset crystallization temperature is 175° C.

Figure 2:
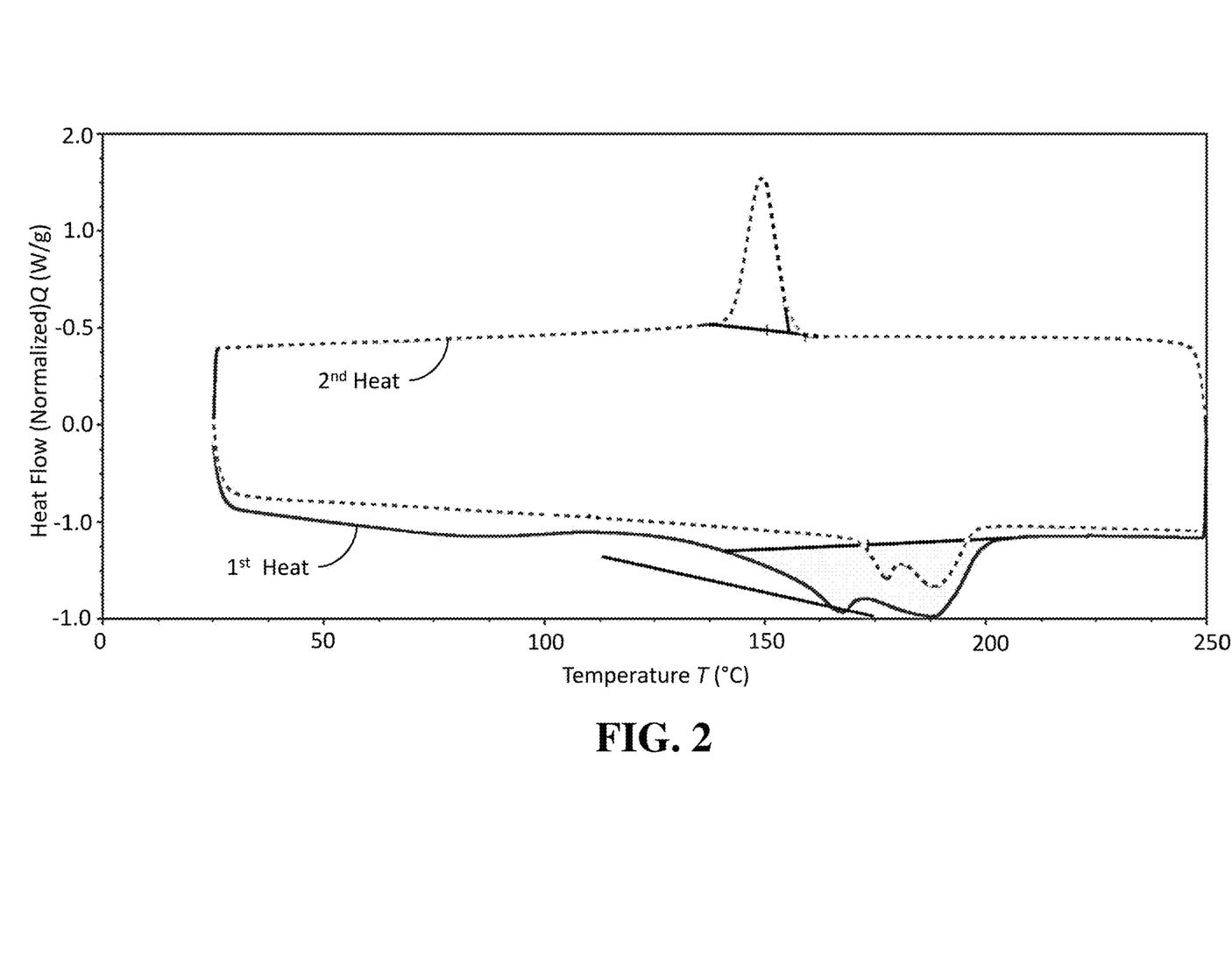
FIG. 2 is a DSC plot of a polyketone powder of the composition of this invention.

Ten grams of the pelletized polyketone is dissolved in 100 ml of N-methypyrrolidone (NMP) at 130° C. to 150° C. while stirring. Upon complete dissolution in the NMP, the temperature is reduced to just about 130° C. The viscosity increases substantially and if desired the solution may be further cooled to form a gel. When the temperature of the solution reaches about 130° C., room temperature DI (deionized) water is added to the solution to precipitate out the polyketone from solution forming a thick slurry. Water is added until no further precipitation is observed. The precipitated powder is vacuum filtered from the solvent and further washed with water to remove any remaining NMP. The dried precipitated powder is dried at 110° C. in air. The thermal behavior of the obtained powder is shown in FIG. 2. From FIG. 2, it is evident that the precipitated powder has a higher enthalpy melt peak than the starting polyketone and the onset temperature of the enthalpy peak and crystallization peak fail to overlap. Also in FIG. 2, it is shown that upon heating a second time under at a heating rate of 10° C./min and holding at a temperature of 250° C. for about 2 minutes, the polyketone has a substantially reduced melt peak enthalpy.

Example 2

Figure 3:
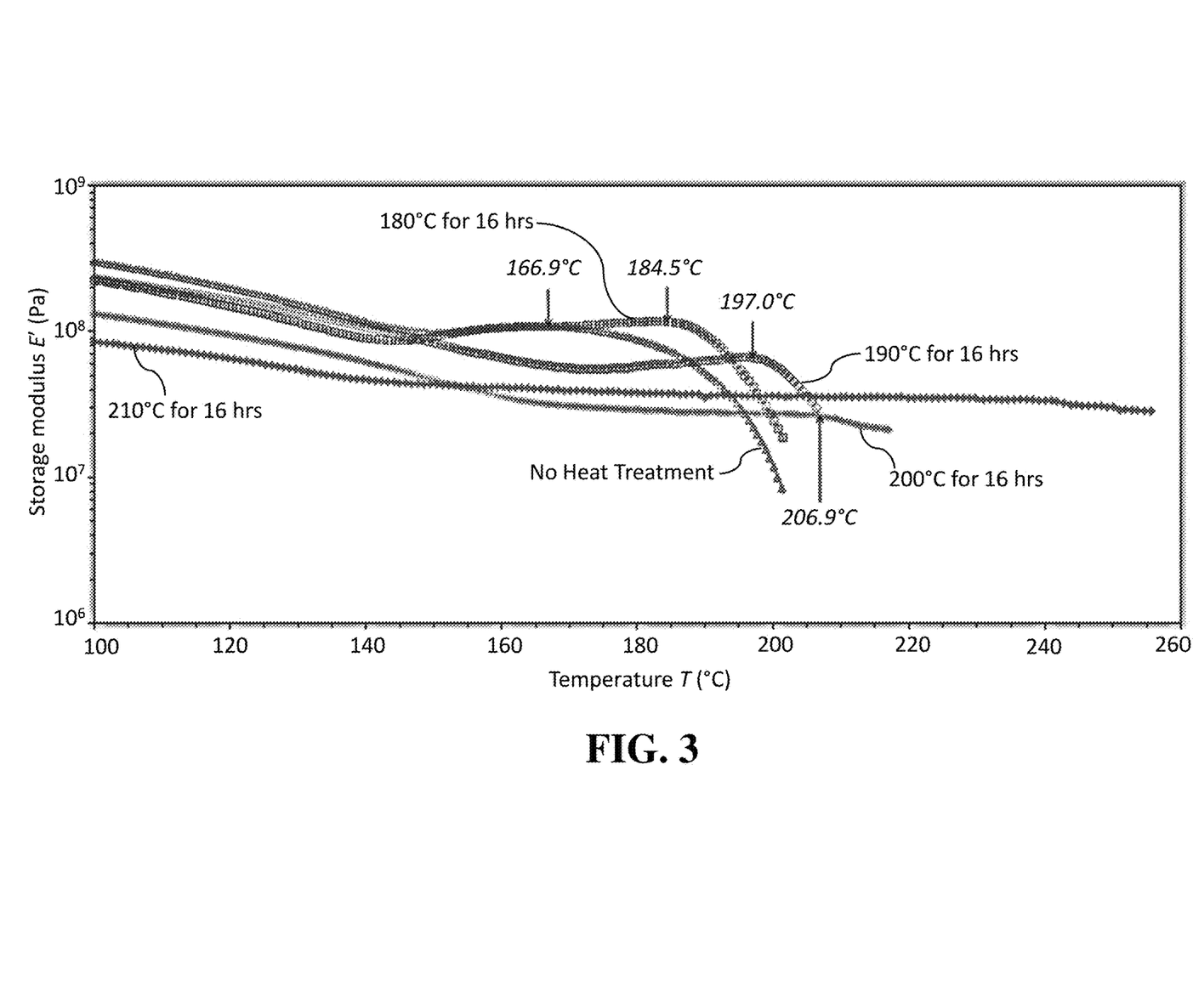
FIG. 3 is a DSC plot of a polyketone powder of the composition of this invention.
Figure 4:
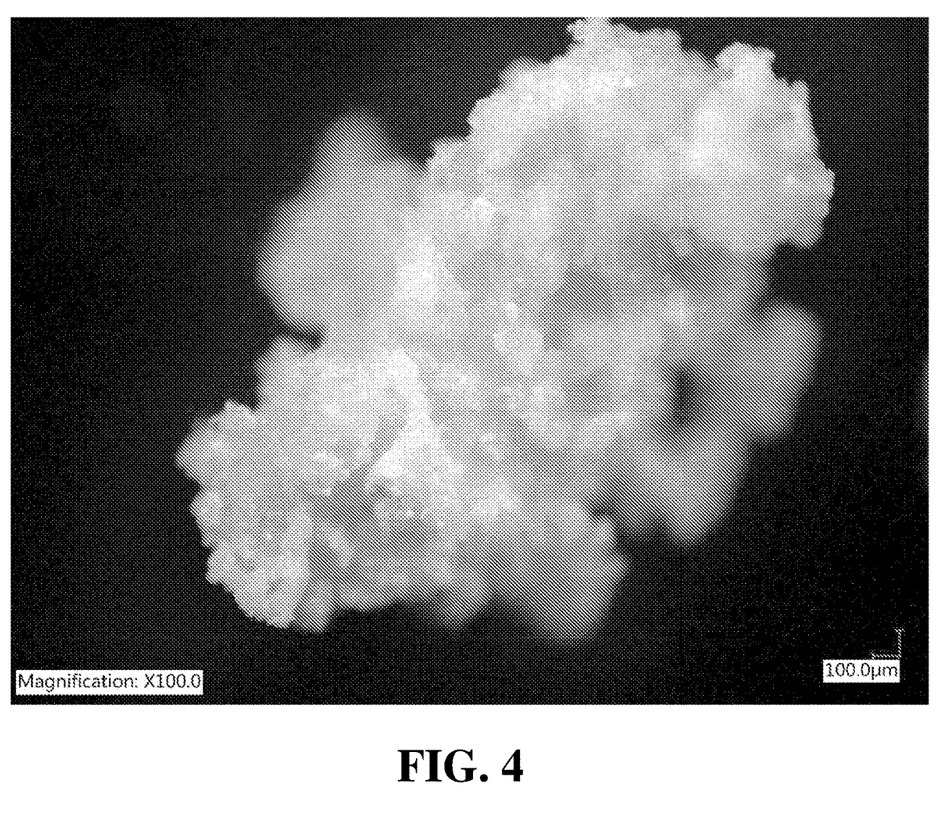
FIG. 4 is an optical micrograph of a polyketone powder of this invention.

Example 1 is repeated except that the nonsolvent water is introduced at a temperature of about 95° C. until the precipitation ceases. FIG. 3 is a DSC of the polyketone of this Example, which shows a melt peak enthalpy that is greater than 175 joules/gram and the onset temperature of the melt peak and crystallization peak fail to overlap. Upon heating a second time, the melt peak is reduced by more than an order of magnitude. FIG. 4 is an optical micrograph of a porous polyketone particulate that is formed by the method that may then be subsequently ground as desired to make a powder useful for additive manufacturing.

Figure 5:
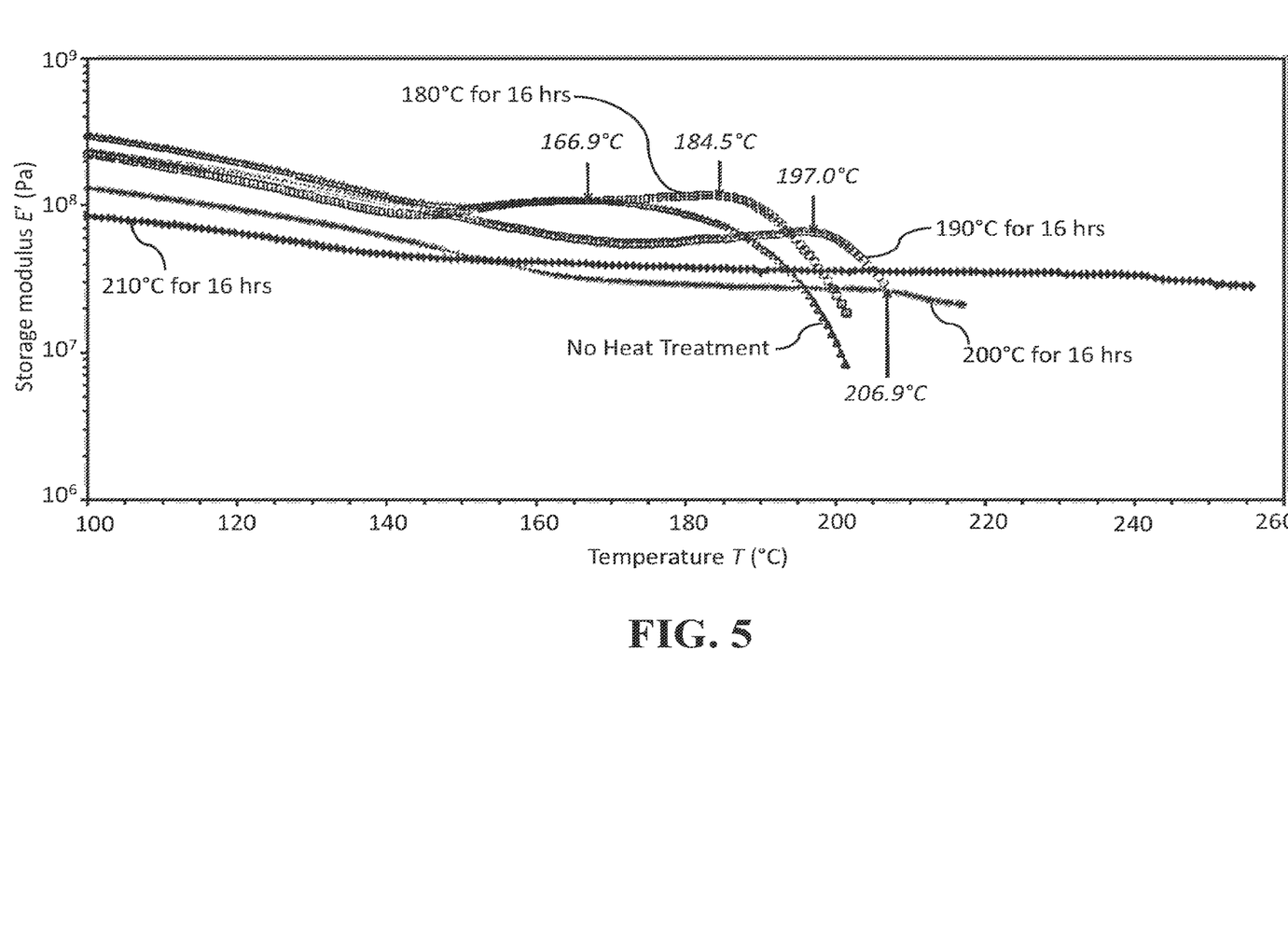
FIG. 5 is a dynamic mechanical analysis plot of polyketone subject to differing heat-treatments.

FIG. 5 shows the results of dynamic mechanical analysis of the polyketone subjected to differing heating temperature. From this, it is readily apparent the polyketone cross-links even below its melt temperature and the method allows for the production of polyketone useful for additive manufacturing without inducing cross-linking, the effect of heating on the polyketone. The temperatures noted are indicative of the polymer flowing or melting whereas the lack of such indicate a crosslinked polymer. The increasing temperature indicates increased cross-linking.

What is claimed is:

1. A composition comprising a semicrystalline aliphatic polyketone powder that has a melt peak having a melt peak enthalpy of at least 50 joules/gram as determined by differential scanning calorimetry (DSC) using a heating rate of 10° C./min, wherein the semicrystalline aliphatic polyketone is represented by:

where A is the residue of an alkene monomer converted to a saturated hydrocarbon group, m is from about 1 to 6 and n is at least about 2 to 10,000.

2. The composition of claim 1, wherein the composition has a $D_{90}$ particle size of at most 300 micrometers and average particle size of 1 micrometer to 150 micrometers equivalent spherical diameter.

3. The composition of claim 1, wherein at least 80% by number of the particles of the semicrystalline polyketone powder has a circularity of at least about 0.8.

4. The composition of claim 3, wherein the semicrystalline aliphatic polyketone powder is a copolymer of ethylene, carbon monoxide and at least one other alkene monomer.

5. The composition of claim 4, wherein the other alkene monomer is propylene.

6. The composition of claim 1, wherein the melt peak and recrystallization peak fail to overlap.

7. The composition of claim 6, wherein the melt peak has an onset melt peak temperature and a recrystallization peak onset temperature that are at least separated by 10° C.

8. The composition of claim 1, wherein the semicrystalline aliphatic polyketone powder has a crystallinity of at least about 15% by volume.

9. The composition of claim 2, wherein semicrystalline aliphatic polyketone powder has: (i) a D90 particle size of less than about 150 µm, (ii) a D10 of at least 10 µm and (iii) an average particle size of about 20 µm to about 150 µm.

10. The composition of claim 1, wherein the melt peak has a melt enthalpy of at least 75 joules/gram.

11. A method for forming an aliphatic polyketone powder useful for making an additive manufactured article comprising;
    (i) dissolving an initial aliphatic polyketone having an onset melt temperature in a solvent above 50° C. to below the onset melt temperature of the initial aliphatic polyketone to form a solution comprised of a dissolved aliphatic polyketone,
    (ii) precipitating the dissolved aliphatic polyketone by cooling the solution, adding a non-solvent to the solution or combination thereof to form the semicrystalline aliphatic polyketone powder, and
    (iii) separating the semicrystalline aliphatic polyketone powder from the solvent, wherein the semicrystalline aliphatic polyketone is represented by:

where A is the residue of an alkene monomer converted to a saturated hydrocarbon group, m is from about 1 to 6 and n is at least about 2 to 10,000 and has a melt peak and recrystallization peak that fail to overlap.

12. The method of claim 11, further comprising comminuting the semicrystalline aliphatic polyketone powder to form a semicrystalline aliphatic comminuted polyketone powder.

13. The method of claim 11 further comprising heating the semicrystalline aliphatic polyketone powder of step (iii) to a temperature within 20% of the onset melt temperature of the semicrystalline aliphatic polyketone to form a heat-treated semicrystalline aliphatic polyketone.

14. The method of claim 13, wherein the semicrystalline aliphatic polyketone has a melt peak enthalpy of at least 75 joules/gram.

15. The method of claim 14, wherein the conditions to increase the crystallinity is comprised of heat treating any one of the said semicrystalline aliphatic polyketone powders to a temperature from 50° C. to below the melt peak temperature as determined by DSC for a time to increase the crystallinity forming an increased crystallinity semicrystalline aliphatic polyketone.

16. The method of claim 11, wherein the dissolving is at a temperature from 100° C. to 150° C.

17. The method of claim 11, wherein the precipitating is performed by adding a nonsolvent comprised of water.

18. The method of claim 17, wherein the precipitating is performed at a temperature from 75° C. to 130° C.

19. The method of claim 11, wherein the initial semicrystalline aliphatic polyketone has a monomodal melt peak and crystallization peak each having an onset temperature that fail to overlap.

20. The method of any one of claim 17, wherein the solvent is a polar aprotic solvent.

* * * * *